United States Patent [19]

Griswold, Jr. et al.

[11] 3,994,128

[45] Nov. 30, 1976

[54] DUAL OUTPUT VARIABLE PITCH TURBOFAN ACTUATION SYSTEM

[75] Inventors: Robert H. Griswold, Jr.; Carl L. Broman, both of Cincinnati, Ohio

[73] Assignee: The United States of America as represented by the Administrator of the National Aeronautics and Space Administration, Washington, D.C.

[22] Filed: May 21, 1975

[21] Appl. No.: 579,375

[52] U.S. Cl. .............................. 60/226 R; 416/160; 416/162; 416/165; 416/167; 416/153
[51] Int. Cl.² ........................ F01D 7/00; F02C 3/04
[58] Field of Search ............ 416/160, 162, 164–168, 416/153, 154, 157 A; 60/226 R

[56] References Cited
UNITED STATES PATENTS

| | | | |
|---|---|---|---|
| 1,890,932 | 12/1932 | Briner | 416/165 |
| 2,679,299 | 5/1954 | Kelson | 416/160 |
| 3,687,569 | 8/1972 | Klompas | 416/160 |
| 3,802,799 | 4/1974 | McMurtry | 416/157 A |
| 3,825,370 | 7/1974 | McMurtry et al. | 416/160 |
| 3,866,415 | 2/1975 | Ciokajlo | 416/157 A |
| 3,873,235 | 3/1975 | Mendelson | 416/157 |
| 3,900,274 | 8/1975 | Johnston et al. | 416/157 A |

*Primary Examiner*—Carlton R. Croyle
*Assistant Examiner*—Robert E. Garrett
*Attorney, Agent, or Firm*—Norman T. Musial; John R. Manning; Dana F. Bigelow

[57] ABSTRACT

An improved actuating mechanism is provided for a gas turbine engine incorporating fan blades of the variable pitch variety, the actuator adapted to rotate the individual fan blades within apertures in an associated fan disc. The actuator includes means such as a pair of synchronizing ring gears, one on each side of the blade shanks, and adapted to engage pinions disposed thereon. Means are provided to impart rotation to the ring gears in opposite directions to effect rotation of the blade shanks in response to a predetermined input signal. In the event of system failure, a run-away actuator is prevented by an improved braking device which arrests the mechanism.

23 Claims, 6 Drawing Figures

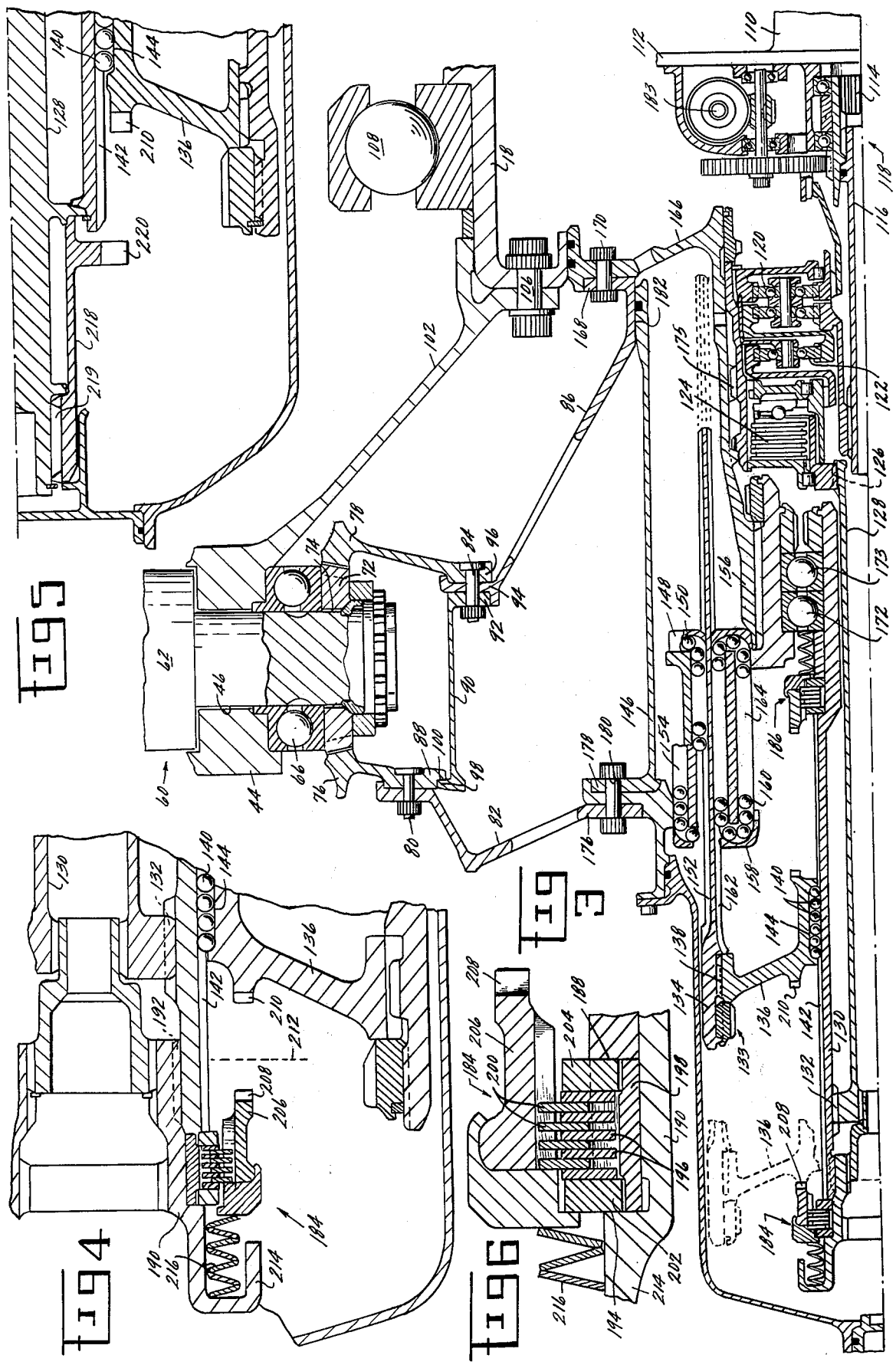

DUAL OUTPUT VARIABLE PITCH TURBOFAN ACTUATION SYSTEM

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention pertains to gas turbofan engines and, more particularly, to actuating mechanisms for variable pitch fan blades used therein.

Jet engines for powering aircraft obtain subsonic performance improvements by use of a fan. The fan is rotatably driven, through shaft connection, by the turbine portion of the engine and serves to pass a large volume of air around the engine, thereby increasing overall engine thrust. In fact, in recent typical commercial fan engines, the fan moves several times as much air as is taken in by the engine compressor. Recently, extensive work has been directed toward varying the pitch of the fan blades. It is believed that many of the same advantages can be obtained as are available with variable pitch propellers since fans are, in reality, directly analogous to propellers with shrouds.

Accordingly, the variable pitch fan is being considered for application on high bypass turbofan engines for improved performance in several areas: noise reduction, thrust reversal, improved thrust response, and overall engine performance. For instance, fully reversible variable pitch fans have been proposed for high bypass ratio engines on STOL-type (short take-off and landing) transports. Cascade-type and target-type thrust reversers which change the direction of the fan airflow passing around the engine (the bypass stream) become large and heavy so that it is highly desirable to find alternative means for generating decelerating thrust. It is possible to generate substantial reverse thrust in a high bypass ratio fan by fan blade pitch reversal which induces pumping of the airflow through the fan blades in the reverse direction.

Recognizing the inherent advantages of incorporating a variable pitch fan in a gas turbofan engine, it becomes necessary to develop a mechanism for efficiently and effectively producing fan blade pitch changes. Consideration must also be given to providing a means of arresting the mechanism to avoid possible engine damage should a malfunction occur which would cause a run-away control.

SUMMARY OF THE INVENTION

An object of the present invention, therefore, is to provide a new and improved variable pitch fan actuating mechanism, efficient and simple in construction, and incorporating a braking device for arresting the mechanism in the event of malfunction.

A further object of the present invention is to provide a lightweight structure capable of withstanding the severe centrifugal forces and driving loads anticipated in normal use.

These and other objects and advantages will be more clearly understood from the following detailed description, the drawings and specific examples, all of which are intended to be typical of rather than in any way limiting to the scope of the present invention.

Briefly stated, the above objects are accomplished by providing a variable pitch fan actuator disposed within and cooperating with the fan disc which carries a plurality of variable pitch airfoils. The actuator, in one form, includes a central shaft adapted to be underdriven or overdriven with respect to fan rotational speed, a first sleeve telescopically receiving the shaft and rotatable and axially translatable with respect thereto, a second sleeve telescoping the shaft and rotatable with respect to both the first sleeve and the shaft, and a casing telescopically receiving both sleeves and rotatable with the first sleeve. Means are provided for turning the fan blades with respect to the disc in response to rotation of the casing and second sleeve with respect to the shaft. A ball screw mechanism to provide first sleeve rotation and translation relative to the shaft, and recirculating ball splines disposed between the first and second sleeves, and between the first sleeve and the casing are also provided to apply the proper rotational directions to the casing and second sleeve.

In the operation of one embodiment, the shaft is imparted with a rotational signal from a source such as a hydraulic motor. The shaft cooperates with the circumscribing first sleeve through a ball screw mechanism to impart relative rotation and translation to the sleeve. The two recirculating ball splines are operatively connected to the first sleeve and accomplish separate but complementary functions. One ball spline has a helix angle which imparts rotational motion to the second sleeve of a magnitude different than that of the first sleeve. The second ball spline transfers the rotational velocity of the first sleeve to the circumscribing casing. Both the casing and second sleeve have ring gears carried thereby which engage a pinion on each blade shank to turn the fan blades in unison with respect to the disc.

The construction of the actuator is such that the large axial loads which tend to separate the ring gears from the pinions due to gear reaction effects are absorbed by a box structure surrounding the blade shank. This permits a lightweight actuator since a heavy structure is not needed to carry the loads elsewhere to be dissipated. Furthermore, a compact, closed axial thrust loop is provided to take up the loads necessary to drive the actuator components up and down the helical ramps associated with, in one embodiment, the ball screw and recirculating helical ball splines.

In the event of a run-away actuator, a brake system is provided to limit circumferential motion, and stops are provided to limit axial travel. In one embodiment, the braking system is of the disc brake variety.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

FIG. 3 is an enlarged cross-sectional view of a portion of the fan pitch actuating mechanism of FIG. 2;

FIG. 4 is a further enlarged cross-sectional view of a brake device for the fan pitch actuating mechanism of FIG. 3;

FIG. 5 is an enlarged cross-sectional view, similar to FIG. 4, of an alternative embodiment of the brake device; and FIG. 6 is a further enlarged cross-sectional view of a portion of the brake device embodied in FIGS. 3 and 4.

DESCRIPTION OF THE PREFERRED EMBODIMENT

Figure 1:
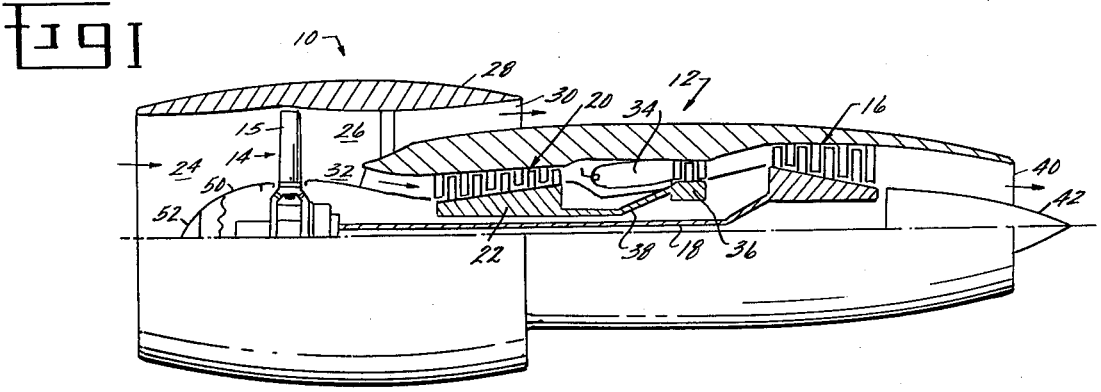
FIG. 1 is a simplified, cross-sectonal view of a typical high bypass turbofan engine including a variable pitch fan.

Referring to the drawings, attention is first directed to FIG. 1 wherein an engine depicted generally at 10 embodying the present invention is diagrammatically shown. This engine may be considered as comprising generally a core engine 12, a fan assembly 14 including a stage of fan blades 15, and a fan turbine 16 which is interconnected to the fan assembly 14 by shaft 18. The core engine 12 includes an axial flow compressor 20 having a rotor 22. Air enters inlet 24 and is initially compressed by fan assembly 14. A first portion of the compressed air enters the fan bypass duct 26 defined, in part, by core engine 12 and a circumscribing fan nacelle 28 and discharges through a fan nozzle 30. A second portion of the compressed air enters the core engine inlet 32, is further compressed by the axial flow compressor 20 and is then discharged to a combustor 34 where fuel is burned to provide high energy combustion gases which drive the turbine 36. The turbine 36, in turn, drives the rotor 22 through a shaft 38 in the usual manner of a gas turbine engine. Hot gases of combustion then pass to and drive the fan turbine 16 which, in turn, drives the fan assembly 14. A propulsive force is thus obtained by the action of the fan assembly 14 discharging air from the fan bypass duct 26 through the fan nozzle 30 and by the discharge of combustion gases from a core engine nozzle 40 defined, in part, by plug 42. The above description is typical of many present-day gas turbine engines and is not meant to be limiting on the scope of the present invention. It will become readily apparent from the following description that the present invention is capable of application to any multibladed fan regardless of how it is driven. Thus, this invention is not necessarily restricted to gas turbine engines of the turbofan variety as depicted. The foregoing description of the operation of the engine depicted in FIG. 1 is, therefore, merely meant to be illustrative of one type of application.

As had been stated above, it has become desirable to permit the variation of the pitch of the fan blades 15 with respect to the incoming motive fluid, typically air. In other words, it is desirable for the fan blades each to be pivoted about their radial axis for the purpose of changing the angle at which the fan blades meet the incoming air. The present invention accomplishes this pitch variation in a uniquely efficient and simplified fashion and, in addition, provides several useful mechanisms to complement this action.

Figure 2:
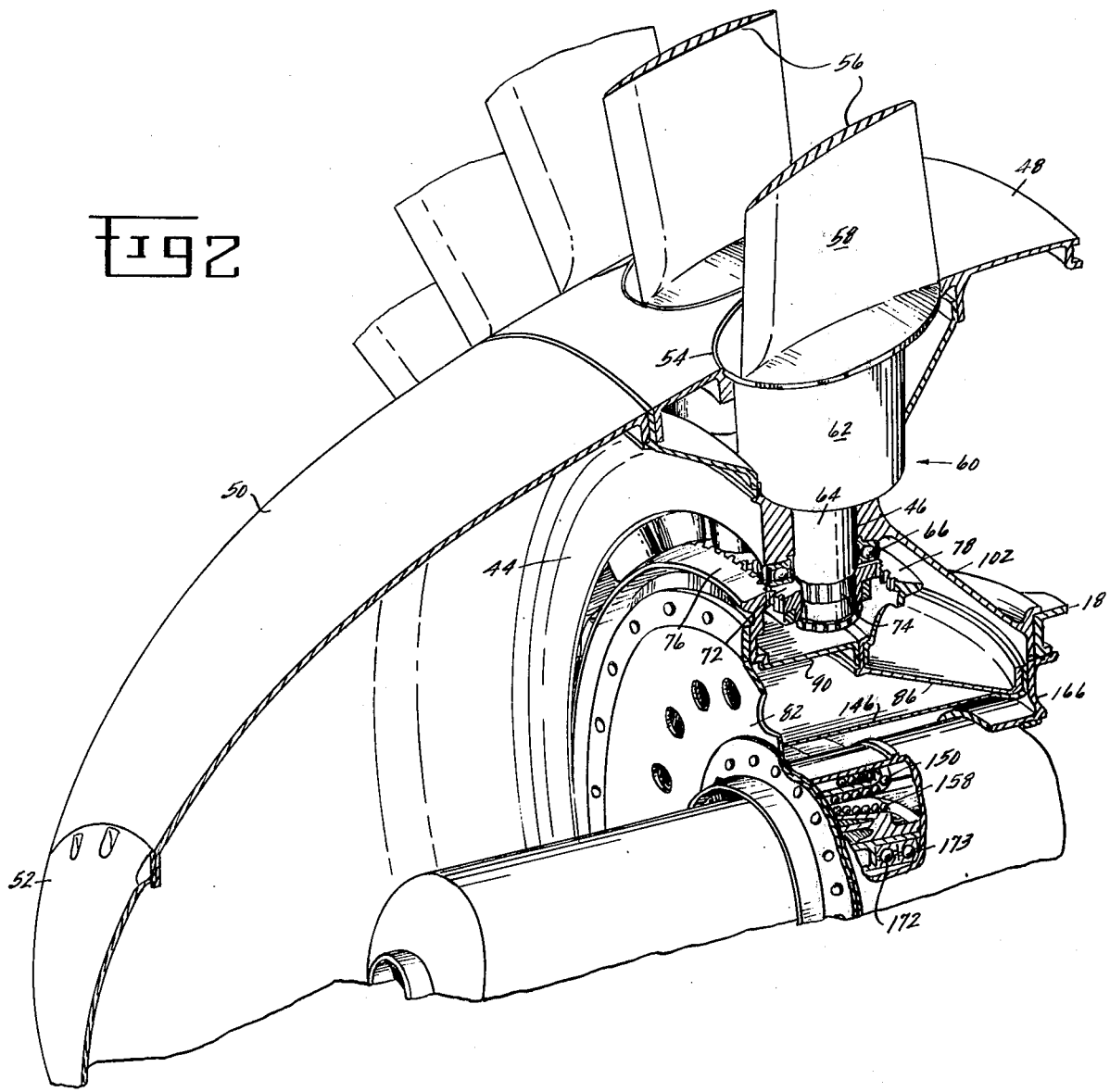
FIG. 2 is a cut-away perspective view of the fan section of the engine of FIG. 1 illustrating the present invention.

Referring to FIG. 2, depicted is a variable pitch turbofan engine which incorporates elements of the present invention. The elements depicted in this view are generally similar in function to those in FIG. 1, but are shown in greater detail and, therefore, different reference numerals are utilized.

A fan disc 44 having a generally circular periphery and being rotatable about its axis is provided with a plurality of apertures in its periphery, a typical aperture designated 46. The apertures are generally circular in cross section and are of stepped diameter to incorporate shoulders capable of receiving abutting members. In addition, the disc carries a conical member 48 on its radially outer extremity, contoured in a fashion appropriate for mating with a generally elliptical bullet nose 50 having a nose cap 52. The conical member 48 is also provided with a plurality of apertures on its periphery, a typical aperture designated 54, each aperture 54 cooperating with an aperture 46. The disc, thus described, is suitable for disposition within the inlet of a turbofan engine similar to that depicted in FIG. 1.

Emanating from the disc 44 are a plurality of fan blades 56. Each of the fan blades incorporates an airfoil 58 with a shank 60 adapted to penetrate one of the apertures 54 in the conical member 48 and a cooperating aperture 46 in the disc. The shank includes an enlarged, generally cylindrical portion 62 and a smaller, generally cylindrical portion 64 adapted to be rotatable within an aperture 46 and to be supported by means of the diameter steps therein. In order to enhance this rotatable character, a bearing 66 is provided between the shank 60 and the aperture 46 to permit relative rotation therebetween.

In order to accomplish pivoting the blade shank 60 and thus the airfoil 58, with respect to the disc, a pinion gear or gear sector 72 is disposed about the shank and cooperates with the shank by means of a mating spline 74. Each such blade has its own spline and sector gear for individual control of its own rotation. In order to accomplish rotation of the blades, a pair of large synchronizing or ring gears 76 and 78 are provided which interlock and mesh with each sector gear, ring gear 76 on the foreward side of the blade shank (to the left in FIG. 2) and gear 78 to the aft side. The ring gears 76, 78 face axially rearwardly and forewardly, respectively, and engage the sector gears. The ring gear 76 is attached as by bolts 80 (FIG. 3) to a large double conical forward torque member 82, while ring gear 78 is attached as by bolts 84 to a large conical rear torque member 86. The torque members 82 and 86 comprise conical, continuous rings extending about internal portions of the pitch change actuating mechanism and interconnected therewith as will be described hereinafter.

According to one major objective of the present invention, there is provided a simplified and lightweight retainer structure for withstanding the severe forces anticipated in normal operation of the gas turbine engine. In particular, at high rotational speeds, gear reaction loads would, absent the structure to be described, tend to separate ring gears 76 and 78 from sector gears 72, the tendency being to force ring gear 76 forward and ring gear 78 aft. To avoid making heavy torque members which would otherwise be necessary to transfer the separating loads back into the remainder of the actuator, it is now possible to make torque members 82 and 86 of a lightweight web construction as depicted through incorporation of a box-like structure about the blade shanks 60.

Briefly, this box construction (retainer means) includes a radially inward extending flange 88 formed, in this embodiment, upon ring gear 76. An annular double-flanged sleeve 90 extends axially between ring gears 76 and 78. Flange 92 of sleeve 90 is attached, by bolts 84, to cooperating flanges 94 and 96 of torque members 86 and ring gear 78, respectively. Upon the other end of sleeve 90 is formed a radially outwardly extending flange 98 which mates with flange 88 at bearing interface 100. As will be seen later, ring gears 76 and 78, since they both impart rotation to blade shanks 60, must rotate in different directions with respect to each other thereby necessitating bearing interface 100. In short, separation of ring gears 76 and 78 is thus prevented by interlocked, cooperating flanges 88 and 98.

According to another major objective of the present invention, there is provided a simplified, reliable and highly efficient mechanism for accomplishing pitch change of the fan blades through rotation of the synchronizing, or ring, gears 76 and 78 introduced hereinabove. The torque required to rotate each of the blades, in a typical rotor, increases with tip speed as well as physical size. The total actuation torque for a bladed rotor equals the summation of torques required for each blade multiplied by a gear ratio. This gear ratio may be typically defined as the pitch diameter of the ring gears 76 and 78 divided by the blade pinion 72 pitch diameter. Due to geometric and other functional considerations, the gear ratio is normally greater than unity and typically between 4:1 and 7:1. In addition, the tip speeds and physical size of the blades associated with variable pitch fans may be very large. Hence, a very large torque may be required from the actuator mechanism to accomplish pitch change. In the present invention, ring gears 76 and 78 are driven in equal but opposite directions, as hereinbefore discussed, by a dual output actuation system. Movement of two ring gears delivers the same work to the pinions with torque levels equal to one-half of that required for a single ring gear actuation system. Reducing actuator torque by a factor of 2 significantly decreases system weight. Nonetheless, the high efficiency operation provided by the present invention greatly improves the practicality of the variable pitch fan mechanism. Elements of this actuating system are introduced and described hereinafter.

Referring now to FIGS. 2 and 3, the elements are depicted in detail. It will be apparent that the majority of the fan blade pitch change actuation mechanism is rotatable with the fan disc, but with various components rotating at different speeds. The fan disc 44 has a substantially conical member 102 extending radially inward therefrom which serves to transmit the shaft 18 rotational motion to the disc through bolted connection 106. The fan and shaft are supported by thrust bearing 108. Thus, the fan disc is secured in a fixed axial relationship with the shaft 18 and adapted to rotate therewith.

Disposed to the radial interior of the shaft 18 and fan disc conical member 102 is a high speed motor 110 which is rigidly affixed to the nonrotating engine frame structure as at interface 112. In the preferred embodiment, motor 110 is of the hydraulic variety but it is recognized that any high speed motor or driving source could be employed. The motor output shaft 114 is splined to an input shaft 116 through a typical mechanical drive indicated generally at 118. The input shaft transfers the high speed, low torque output of the hydraulic motor 110 to a planetary differential gear system 120 and a torque reducing gear 122 (which may not be required on all applications). The output of the planetary differential and reducing gears passes through gear connections to a device which has become known in the art as a "no-back" 124. The function of the no-back is to lock the fan blades at their current pitch angle in the event of a system failure. Thus, activation of the low torque input shaft 116 rotates the differential gearing 120, torque device 122 and no-back 124 and, through splined connection 126, an inner shaft 128 at a reduced speed and higher torque.

Disposed to the radial exterior of and circumscribing the shaft 128 is an outer fan shaft 130 which is splined thereto at 132 and which, therefore, rotates with shaft 128. In some applications where weight is not an overriding consideration, the redundancy of shafts 128 and 130 may be eliminated. Receiving the outer shaft 130 telescopically in a loose, cooperating relationship is a (first) sleeve 133 comprising a generally cylindrical portion 134 and a carriage 136. The sleeve is of generally annular cross section to conform with the cross-sectional shape of the shafts. As a result, but for the elements to be described, the sleeve portion 134 would be freely rotatable about shaft 130 and also freely translatable axially with respect thereto.

Disposed between the shaft 130 and sleeve portion 134 is the carriage 136 which is mated by means of a spline to sleeve portion 134 at 138 and which supports a number of ball screw members, a typical one of which is shown and designated 140. The balls are disposed within helical grooves 142 and 144 carried by the shaft and carriage, respectively. As a result of the disposition of the ball screw members between the shaft and carriage 136, clockwise or counterclockwise rotation of the shaft 130 causes the carriage and sleeve portion 134 to climb the helical ramp formed by the grooves and to translate forward or aft (as shown in phantom) in FIG. 3 depending on the direction of the helical grooving. Due to the great number of helical turns of groove 142, the carriage is caused to rotate many times for each rotation of fan shaft 130. The ball screw members thus provide the axial motive force required to drive the remainder of the actuation mechanism and are a vast improvement over the complex and vulnerable hydraulic piston arrangements of the past. The number of ball screw members disposed about the shaft depends upon the loading conditions in each case necessary to permit the fully loaded device to move as described. Furthermore, it is conceivable that, in certain applications, the ball screw members could be replaced with cooperating screw threads on the shaft and carriage (or sleeve).

Disposed to the radial exterior of and circumscribing the sleeve 133 is a casing 146 which forms a housing for the forward portion of the actuator and which receives the sleeve telescopically in a cooperating relationship. The casing, like the sleeve, is of generally annular cross section to provide conformity therebetween. As a result, but for the next elements to be described, the casing would be freely rotatable about the sleeve and the shaft.

Between the sleeve 133 and casing 146 is disposed a housing 148 which supports a mating means comprising a number of recirculating ball spline members, a typical one of which is shown and designated 150. The ball spline member 150 is provided in a generally helical disposition about the inner surface of the casing 146 and the outer surface of the sleeve member 134. The balls recirculate within grooves 152 and 154 carried by the sleeve and casing, respectively. In the case of ball spline 150, the helix angle, that is, the angle at which the ball spline is disposed relative to the surface of the mating members, is zero, with the result that this ball spline is essentially linear in the direction of the axis of the engine. In consequence to the disposition of the ball spline between the casing and sleeve and the linear orientation of the ball spline, rotation of the casing about the sleeve is inhibited while axial relative translation therebetween is facilitated. Again, the number of ball spline arrangements disposed about the sleeve depends upon the loading conditions in each case necessary to permit the fully loaded device to translate as described.

To the radial interior of sleeve member 134, and adapted to be telescopically received thereby in a loose fitting relationship, is disposed another (second) sleeve 156 which, but for another mating means comprising a second set of ball splines to be described, would also be freely rotatable and axially translatable with respect to the sleeve 133 and, hence, the shafts. Annular housing 158 incorporates the second set of ball splines, represented by typical recirculating ball spline 160, which cooperates with and recirculates through grooves 162 and 164 in the first sleeve 133 and housing 158, respectively. The ball spline 160 is provided with a second predetermined helix angle, which is other than zero in this instance, so that in the perspective view of FIG. 2 the ball spline has a screw thread appearance as opposed to the linear appearance of ball spline 150. By means of a bolted relationship between a flanged radially outwardly extending conical portion 166 of the second sleeve 156 and a rearward flange 168 of torque member 86, at the bolt interface designated 170, the second sleeve is axially fixed with respect to the fan disc 44 and shaft 18 but, by means of appropriate bearing elements 172 and 173, is freely rotatable thereabout. The second sleeve is therefore also rotatable with respect to shaft 18 at the bearing interface 174 therebetween.

The helix angle of recirculating ball spline 160 is chosen such that the relative rotational motion imparted to the second sleeve 156 is equal and opposite to that imparted to the casing 146 by the ball screw 144 through recirculating ball spline 150. The second sleeve is splined to the planetary differential gearing at 175.

A radially inwardly extending flange 176 is formed integrally upon double conical forward torque member 82, which mates with a cooperating radially outwardly extending flange 178 on casing member 146 at the bolt interface designated 180. It is through this bolted connection that the casing 146 is made axially fixed with respect to the fan disc 44 and shaft 18. Thus, it is apparent that ring gear 76 is essentially carried by the casing 146 and forward torque member 82, while ring gear 78 is essentially carried by the second sleeve 156 and aft torque member 86. An appropriate bearing surface 182 is provided between these relatively rotating systems.

In operation, during steady-state conditions wherein the fan blade pitch remains unchanged, the fan disc 44 is rotated by shaft 18 and equal rotational velocity about the engine centerline is imparted to torque members 82 and 86. Through casing 146 and linear recirculating ball spline 150 the rotational motion is imparted to sleeve 133. Similarly, the second sleeve 166 transfers the rotational motion of the aft torque member 86 to the differential gearing 120 and no-back 124 which, in turn, rotates shafts 128 and 130. Thus, the rotational motion of shafts 130 and carriage 136 is the same and the system is in equilibrium. There is no input force compelling the ball screw 150 to climb its helical ramp.

In the present embodiment, actuation of the pitch change mechanism is initiated by exciting hydraulic motor 110 in response to a predetermined signal and imparting rotation to shaft 114. Rotation of the hydraulic motor will be clockwise or counterclockwise depending on the desired direction of pitch change. This high speed rotation is imparted to shaft 116 from mechanical drive 118 to the differential gear system 120 which, in turn, over- or under-drives shaft 128 (depending upon the direction of rotation of motor 110) which otherwise would be rotating at fan shaft 18 speed. Thus, there is a differential rpm established between shaft 18 and shaft 128. Since shaft 130 is splined to shaft 128, it too is over- or under-driven.

In response to this change in rpm, the ball screw 140 will climb its helical ramp formed by grooves 142 and carry with it sleeve 133 in linear and rotational motion with respect to shaft 130. The sleeve 133 will translate axially between the two recirculating ball splines 154 and 156 and, due to the zero helix angle of ball spline 154, will rotate the casing 146 at the same rotational velocity as the sleeve 133. Torque member 156 transmits this rotation to ring gear 86 which, in turn, meshes with pinion gear 72. This ultimately results in pitch change of the blades 58.

Simultaneous with the rotation of ring gear 76, the pitch change mechanism causes a rotation of ring gear 78 in a direction opposite to that of ring gear 76. This is accomplished through interaction of recirculating ball splines 150 and 160, and their associated members in response to axial translation of sleeve 133. This can be appreciated by remembering that spline 150 is provided with a zero helix angle and the rotational motion of casing 146 is determined by the helix angle of ball screw 140. However, the motion of the second sleeve 156 is determined by the cumulative effects of the helix angle of ball screw 140 and recirculating ball spline 160, the helix angle of spline 160 being discretely chosen to create equal and opposite rotation of ring gear 78 with respect to ring gear 76. This rotation of ring gears 76 and 78 will be relative rotation with respect to the disc 44 which is secured to the shaft 18 and thus immovable with respect thereto.

In the present embodiment, the casing rotates with the sleeve 133 due to the zero helix angle of spline 150. The same effect may be accomplished by using a spline having an other than zero helix angle if proper compensation is made in the helix angle of spline 160. However, for the sake of simplicity, a zero helix angle has been chosen here. The amount of pitch change per revolution of hydraulic motor 110 is thus made to depend upon the interaction and cumulative effects of the ball screw and helical splines.

The relative rotation between the ring gears and disc 44 results in relative motion between the teeth of the ring gears and the shanks 60 of each blade as well as with the gear teeth carried by the pinion 72 mounted upon each shank. Since the movement of the blades 58 is limited to rotation of the shank relative to the disc, the meshing of the ring gears 76 and 78 and gear teeth of the pinions 72 will result in rotation between the blade and disc and the pitch change will thus be accomplished. Pitch change in the reverse direction is accomplished by imposition of rotation of the hydraulic motor 110 in the opposite direction, each of the above-described motions being reversed.

Depending upon blade configuration, the actuator can be utilized to change pitch between predetermined angular orientations up to and including reverse pitch, wherein rotation of the disc 44 actually pumps air through the fan from the aft to the forward direction. This type of operation would permit the elimination from the associated engine of the common thrust reversers used in present technology to accomplish velocity reduction upon landing the aircraft to supplement the action of the wheel brakes. The fan blades are actuatable by means of the present actuating device into an infinite number of pitch positions depending upon the amount of rotation of hydraulic motor 110.

It is significant to note that in the configuration of the present embodiment, a closed axial thrust loop is formed which takes out most of the axial loads required to drive the ball screw and recirculating helical ball splines up or down their respective helical ramps. In particular, this axial thrust loop comprises shaft 130, ball screw 140, sleeve 133, ball spline 160, sleeve 156 and bearings 172, 173. This provides for an efficient and lightweight structure since the loads do not have to be transferred over great distances requiring a hefty structure.

Another convenience provided by the present invention is that the sensing device, or motion transducer 183 which senses the change in blade pitch angle is rigidly affixed to static structure. In other words, it is referenced to ground. This permits the transducers to be mounted to static structures and eliminates the need for electrical slip rings as used in the prior art.

Another problem solved by the present invention is that of a reliable braking system to limit circumferential and axial travel of the pitch-changing mechanism in the event of a run-away hydraulic motor. In other words, a braking system is required to limit the travel of the carriage 136 under the action of ball screw 140 lest it thread itself off of shaft 130 in the forward direction or jam into the remaining structure in the aft direction.

In addition, it is desirable that the limiting or braking device provide a soft stop rather than a hard stop due to the potential of structural failures at the interface. In other words, what is desired is a means to gradually absorb the energy of the pitch changing mechanism in bringing it to a halt. Admittedly, this will occur in a matter of a fraction of a second, but the result is not the catastrophic one of bringing the system to an instantaneous halt.

Two systems are shown which have proven to be effective. In the preferred embodiment of FIGS. 2 and 3, and shown in detail in FIGS. 4 and 6, a brake system depicted generally at 184 is disposed at the forward end of shaft 130 and a similar braking system 186 is disposed near the aft limit of travel of carriage 136. Directing attention to braking means 184, since it is typical of operation of both brakes, it is shown that shaft 130 terminates at 188. An axial extension 190 is provided which is telescopically received within and splined to the shaft at 192. Means (not shown) are provided to rigidly affix the axial position of the extension with respect to the shaft. The braking means 184 circumscribes the shaft extension and is captured between a shoulder 194 of the extension and terminus 188 of the shaft. The brake is constructed essentially as follows:

A first plurality of radially extending, axially spaced, annular discs 196 are keyed to an annular sleeve 198 splined to extension 190. Thus, these discs are captured and are not free to rotate. A second plurality of discs 200 similar to the first discs are interspaced therebetween. Springs 202 and 204 place an axial load on the disc, squeezing them into cooperating frictional engagement. Carrier 206 is slidingly splined to only discs 200 and, under a rotational force, serves to rotate discs 200 with respect to discs 196 in the manner of a disc brake.

In the present embodiment, carrier 206 has a ring of gear teeth 208 disposed upon the aft end, these teeth adapted to engage a similar set of teeth 210 disposed upon the front of carriage 136. During normal blade pitch change actuation, the maximum forward position of the carriage 136 is indicated approximately by line 212. However, in the event of a run-away condition, the pitch change mechanism may screw forward, as in phantom (FIG. 3), with carriage 136 engaging gear teeth 208. In response, carrier 206 will produce relative frictional movement between the discs which will absorb the energy of the system. Since carrier 206 is slidingly splined to the discs 200, it will continue to translate axially forward with the carriage 136 after engagement and until all the system energy is dissipated at the disc interfaces. In the event that this is insufficient to halt the forward motion of the system, a U-shaped hard stop 214 is provided to arrest carrier 206. However, by this time sufficient energy should have been absorbed such that the hard stop is not catastrophic. A spring 216 between the hard stop and carrier assists in absorbing additional energy prior to contact with the hard stop, and returns the carrier 206 to its original axial position.

A second embodiment of a braking device is shown in FIG. 5. Therein, a forward sleeve 218 telescopically receives the forward end of shaft 128 and is splined thereto at 219. As the pitch change actuator races forward, the teeth 210 of carriage 136 engage gear teeth 220 which extend radially from sleeve 218. Upon engagement, due to the relative rotational velocity of shaft 128 and carriage 136, shaft 128 is caused to twist in the manner of a torsion rod, thus absorbing rotational energy. This arrangement offers the advantage of mechanical simplicity.

It should become obvious to one skilled in the art that certain changes can be made to the above-described invention without departing from the broad inventive concepts thereof. For example, the ball screw could be replaced with a threaded connection in some applications. Similarly, the recirculating ball spline could be replaced with ordinary straight or helical splines. Further, the helix angles are variable depending on anticipated actuation loads and the speed of actuation desired. While a dual actuation system has been depicted, still other embodiments may permit the elimination of one of the torque members and its associated hardware. Additionally, many types of brake mechanisms are possible, including caliper-type disc brakes. Furthermore, in certain applications, it may be desirable to routinely limit actuator travel by engaging the brakes. It is intended that the appended claims cover these and all other variations in the present invention's broader inventive concepts.

Having thus described the invention, what is considered novel and desired to be secured by Letters Patent of the United States is:

1. In a turbofan engine of the variety including an annular fan duct, a core engine disposed internally of the fan duct and comprising a compressor, a combustion chamber and a turbine, a variable pitch fan comprising:

a fan disc, generally circular in peripheral shape, rotatable about its axis and having a plurality of apertures in its periphery;

a fan blade disposed within said duct and including a shank adapted to penetrate one of said apertures;

bearing means interconnecting said shank and said one aperture and permitting relative rotation therebetween; and pitch varying means for rotating said shank comprising:

a shaft coaxial and rotatable with said disc, the shaft secured in a predetermined axial relationship with the disc;

a first sleeve telescopically receiving the shaft, said first sleeve being axially translatable with respect to and rotatable about the shaft;

a second sleeve telescopically received in the first sleeve, said second sleeve being rotatable within said first sleeve and about said shaft;

a casing telescopically receiving the shaft, the first sleeve and the second sleeve, the casing being rotatable about the shaft;

first means carried by the casing for rotating said blade shank in response to rotation of the casing about the shaft;

second means carried by the second sleeve and cooperating with said first means for rotating said blade shank in response to rotation of said second sleeve with respect to said first sleeve;

third means cooperating with the first sleeve and the shaft for causing rotation and translation of the first sleeve in response to differential rotation of the shaft with respect to the disc;

first mating means disposed between the first sleeve and the casing and having a predetermined first helix angle for permitting said first sleeve to translate with respect to the casing and the casing to rotate about the shaft;

thrust bearing means carried between the shaft and second sleeve; and second mating means operatively connecting the first sleeve and the second sleeve and having a predetermined second helix angle for permitting said rotation about the first sleeve and the shaft, and wherein the shaft, the first and second sleeves, the second mating means, and the thrust bearing means are interconnected to form a closed axial thrust loop.

2. The fan of claim 1 wherein said first means includes a first ring gear carried by the casing and a pinion carried by the shank.

3. The fan of claim 1 wherein said second means includes a second ring gear carried by the second sleeve and the pinion carried by the shank.

4. The fan of claim 1 wherein said third means includes first threads disposed upon the shaft and cooperating second threads disposed upon the first sleeve.

5. The fan of claim 1 wherein said third means includes ball screw means disposed between the shaft and the first sleeve.

6. The fan of claim 1 wherein said first mating means comprises a first recirculating ball spline means.

7. The fan of claim 1 wherein said second mating means comprises a second recirculating ball spline means.

8. The fan of claim 1 wherein said first helix angle is a zero helix angle.

9. The fan of claim 1 further including retainer means cooperating with said first means and said second means to prevent axial displacement therebetween under centrifugal loading.

10. The fan of claim 2 wherein said second means includes a second ring gear carried by the second sleeve and the pinion carried by the shank.

11. The fan of claim 10 further including retainer means, and wherein said retainer means includes first shoulder means carried by said first means; and second shoulder means carried by said second means and adapted to cooperate with said first shoulder means through a bearing surface therebetween to prevent relative axial displacement thereof.

12. The fan of claim 9 wherein the first ring gear and the second ring gear are axially disposed on opposite sides of the shank and adapted to rotate in opposite directions.

13. The fan of claim 1 further including brake means connected to the shaft for limiting circumferential travel of said pitch changing means with respect to the shaft.

14. The fan of claim 13 wherein said brake means is of the disc brake variety, comprising a first plurality of radially extending, axially spaced discs fixedly connected to the shaft, a second plurality of radially extending, axially spaced discs in alternating frictional engagement with the first plurality of discs; and means for engaging the first sleeve with the second plurality of discs to impart rotation thereto when the first sleeve has substantially reached its limit of axial travel.

15. The fan of claim 14 further including stop means fixedly connected to the shaft to limit axial movement of said first sleeve.

16. The fan of claim 13 further including:
first teeth carried by the shaft; and
second teeth carried by the first sleeve and adapted to mechanically engage said first teeth when the first sleeve exceeds a predetermined axial travel and whereby rotational energy of the pitch varying means is absorbed by torsion of said shaft.

17. The fan of claim 14 wherein the engaging means comprises a carrier slidingly splined to the second plurality of discs, the carried including a first plurality of teeth which engage a cooperating second plurality of teeth on the first sleeve when the first sleeve has substantially reached its limit of axial travel.

18. An actuator for changing the pitch of a fan blade carried by a rotatable disc comprising:
a shaft coaxial with the disc and secured in a constant axial spacial relationship therewith;
motor means driving said shaft at a differential rotational speed with respect to the disc;
a sleeve telescopically receiving the shaft and operatively connected to a ring gear which engages a sector gear connected to the blade to effect the pitch change thereof;
a recirculating ball actuator to drive the sleeve linearly and rotationally with respect to the shaft, thereby imparting rotational motion to the ring gear;
brake means connected to the shaft for limiting the rotational travel of the sleeve with respect to the shaft, wherein said brake means is of the disc variety, comprising a first plurality of radially extending, axially spaced discs fixedly connected to the shaft, a second plurality of radially extending, axially spaced discs in alternating frictional engagement with the first plurality of discs; and means for engaging the sleeve with the second plurality of discs to impart rotation thereto when the sleeve has substantially reached its limit of linear travel.

19. The actuator as recited in claim 18 further comprising stop means fixedly connected to the shaft to limit linear travel of the sleeve.

20. The actuator as recited in claim 18 wherein the engaging means comprises a carrier slidingly splined to the second plurality of discs, the carrier including a first plurality of teeth which engage a cooperating second plurality of teeth on the sleeve when the sleeve has substantially reached its limit of linear travel.

21. The actuator as recited in claim 20 wherein the carrier engages a stop means fixedly connected to the shaft to limit linear travel of the sleeve.

22. The actuator as recited in claim 21 wherein the stop means comprises a radial extension of the shaft and a spring disposed between the radial extension and the carrier.

23. The actuator as recited in claim 18 wherein said brake means comprises a first plurality of teeth fixedly carried by the shaft which engage a second plurality of teeth on the sleeve when the sleeve reaches a predetermined linear travel such that rotational energy of the actuator is absorbed through the sleeve by torsion of the shaft.

* * * * *